United States Patent [19]

Krude

[11] Patent Number: 4,610,643
[45] Date of Patent: Sep. 9, 1986

[54] ROTARY CONSTANT VELOCITY UNIVERSAL JOINT

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 702,851

[22] Filed: Feb. 19, 1985

Related U.S. Application Data

[63] Continuation of Ser. No. 475,379, Mar. 14, 1983, abandoned.

[30] Foreign Application Priority Data

Mar. 17, 1982 [DE] Fed. Rep. of Germany ....... 3209596

[51] Int. Cl.$^4$ .............................................. F16D 3/24
[52] U.S. Cl. ..................................... 464/143; 464/906
[58] Field of Search ................. 464/143, 145, 146, 906

[56] References Cited

U.S. PATENT DOCUMENTS

| | | | |
|---|---|---|---|
| 1,975,758 | 10/1934 | Stuber | 464/145 |
| 2,579,356 | 12/1951 | Anderson | 464/906 X |
| 3,475,924 | 11/1969 | Aucktor | 464/145 X |
| 3,553,979 | 1/1971 | Noguchi et al. | 464/145 |
| 3,789,624 | 2/1974 | Camosso | 464/145 |
| 3,879,960 | 4/1975 | Welschof et al. | 464/145 |
| 4,116,020 | 9/1978 | Aucktor et al. | 464/145 |
| 4,185,476 | 1/1980 | Krude | 464/145 |
| 4,305,263 | 12/1981 | Kako et al. | 464/145 |
| 4,358,283 | 11/1982 | Kumpar | 464/906 X |
| 4,459,122 | 7/1984 | Rehfeld | 464/143 |

FOREIGN PATENT DOCUMENTS

| | | | |
|---|---|---|---|
| 126124 | 9/1980 | Japan | 464/145 |
| 1446159 | 8/1976 | United Kingdom | 464/145 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A universal joint wherein torque-transmitting balls are engaged between complementary grooves formed in an inner and outer joint member, with the balls being supported by a supporting element which is arranged in a jaw-like opening formed on one side of the universal joint through which the balls may be inserted in operative engagement within the joint. The invention is directed toward the curvature of the grooves which are arranged in such a way that a connecting line extending between the center of the radius of curvature of the grooves and the center of the torque-transmitting balls forms an angle relative to the central axis of rotation of the joint which is smaller than or equal to 85°, the angle being taken in accordance with the arcsine of the projection of the center of the radius of curvature of the grooves and the ball center onto a vertical plane extending perpendicularly relative to the axis of rotation of the joint, divided by the length of the radius of curvature.

11 Claims, 18 Drawing Figures

ROTARY CONSTANT VELOCITY UNIVERSAL JOINT

This is a continuation of application Ser. No. 475,379 filed Mar. 14, 1983, now abandoned.

The present invention relates generally to a rotary constant velocity universal joint and more particularly to a joint which includes an outer hollow joint member having an inner wall provided with grooves, an inner joint member which is arranged in the outer joint member having an outer wall provided with a number of grooves corresponding to the number of grooves in the outer joint member, with the centerlines of the grooves of the inner joint member being curved and with one groove of each of the outer and inner joint member forming a jaw-like opening for directing torque-transmitting balls into the angle bisecting plane and jointly receiving a ball for torque transmitting purposes.

Joints of the type to which the present invention relates are known in the prior art for example from U.S. Pat. No. 1,975,758 wherein the torque-transmitting balls are controlled by a wedge-like cooperation between two grooves and wherein the jaw-shaped opening of the grooves in the extended joint occurs toward the joint interior. However, even with a small articulation angle of less than 30°, the jaw-like opening will open toward the end opposite the joint interior. As a result, the torque-transmitting balls are jammed in or will even fall out so that at the same time the joint is destroyed. With such a joint, a supporting system with a cage is required which prevents the balls from being pressed outwardly since otherwise only small angles of articulation would be possible due to the offset of the centers of the ball grooves of the inner and outer joint members relative to the joint center. Since this offset will be unfavorably small, it will not enable the joint to be adapted to the contact between the ball and the groove. The latter dependence can be shown theoretically.

Other joints are known in the prior art, for example from U.S. Pat. No. 4,116,020, wherein the grooves serving to receive the balls extend relative to each other in such a manner that the grooves of the inner and outer joint member not only require a cage but, in addition, a supporting element which holds the cage in position when the joint is articulated.

The present invention is directed toward provision of a joint structure which will simplify the structural arrangement of the joint while maintaining favorable production or manufacturing conditions. Furthermore, the invention is directed toward a system which will simplify the guidance system for the torque-transmitting balls and will increase the angle of articulation of the joint.

Additionally, the invention is directed toward achievement of easy axial assembly of the joint without requiring axial clearance or axial play while permitting a type of assembly which will subsequently allow the components to be connected in a manner wherein they cannot be unfastened from each other.

SUMMARY OF THE INVENTION

Briefly, the present invention may be described as a universal joint assembly including an inner joint member and an outer joint member with torque-transmitting balls arranged in torque-transmitting engagement therebetween wherein the balls in the joint interior, at one end, are supported by a supporting element arranged at jaw-like openings at one end of the curved grooves and wherein the curved grooves of the inner and outer joint members are arranged in such a way that a connecting line extending between the center of the radius of curvature of the grooves and the ball center forms an angle $\omega$ relative to the axis of rotation of the respective joint member, with the angle $\omega$ being smaller than or equal to 85°. This type of arrangement, taking into account the respective effective contacts between the ball and the ball groove, prevents a reversal of the jaw-like opening.

The advantage of the invention is that when producing the two-part outer joint member, for example, the part containing the grooves may be manufactured as a standard part whereas the connecting part may be produced for different connecting dimensions. In this way, the amount of material required for producing the joint and the storage costs thereof are reduced. Additionally, the invention is such that it enables the application of cold forming production techniques in a particularly favorable manner.

A further advantage of the invention consists in the fact that it is possible to use a particularly simple form for the supporting part which ensures functioning of the conventional cage. Because of the direction of the groove, it is ensured that at any angle of articulation the torque-transmitting balls will be pressed against the supporting element. Even with large articulation angles exceeding 40°, appropriate support will still be provided so that from this point of view there are no restrictions on the joint insofar as such an embodiment is concerned.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
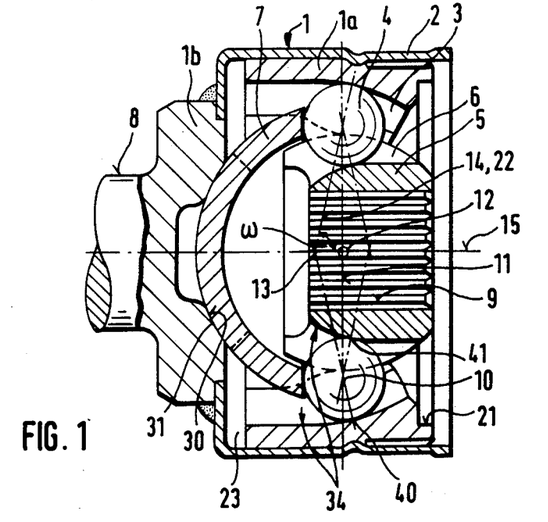
FIG. 1 is a longitudinal sectional view taken through a rotary constant velocity universal joint in accordance with the present invention which is undercut-free and which has a supporting element.

Referring now to the drawings, and more particularly to FIG. 1, there is shown a rotary constant velocity universal joint embodying the present invention which essentially consists of an outer joint member 1 formed in two parts. The two parts of the outer joint member 1 are denoted part 1a and 1b and are surrounded by a sleeve 2 in a form-fitted manner so that the sleeve 2 may be welded to the part 1b in order to be formed as one unit during production of the assembly.

Part 1a of the outer joint member is provided with grooves 3 which receive therein torque-transmitting balls 4.

The outer joint member 1 forms a hollow space wherein there is accommodated an inner joint member 5 which is also formed with grooves 6 in which the torque-transmitting balls 4 are engaged or guided. The grooves 3 and 6 extend in such a manner that they are formed undercut-free and so that they form a jaw-like opening extending toward the joint interior. As a result of the reduction in the cross-section of the grooves 3 and 6 toward the end face of the outer joint member, the balls 4 are constantly pushed toward the jaw-like open end of the grooves. In order to prevent the balls from falling out of the joint interior, there is provided a supporting element 7 which secures the balls in place within the joint assembly.

The part 1b of the outer joint member is formed with a connecting pin 8 which may be adapted to different connecting dimensions. At the opposite end, provision is made for splines 9 in the inner joint member 5 in order to enable it to receive therein a drive shaft (not shown).

In the operation of the joint assembly, the balls 4 are constantly pushed against the supporting element 7 at any angle of articulation of the joint. The balls 4 comprise ball centers 10 which form a plane 11 which extends through the joint center 12, with the radius of curvature intersecting the center 13 of the radius of curvature 14 and the axis of rotation 15 of the respective joint member 1 or 5 at an angle $\omega$ which is smaller than or equal to 85°.

Figure 2:
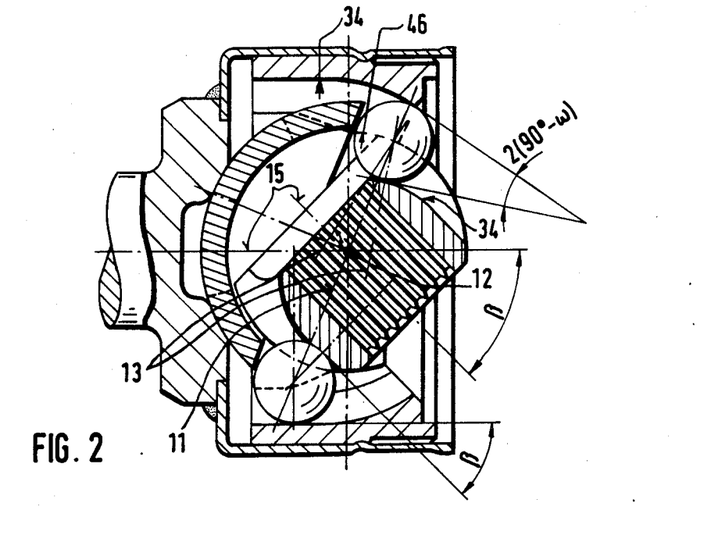
FIG. 2 is a sectional view showing the joint of FIG. 1 in an articulated position.

FIG. 2 shows the joint illustrated in FIG. 1 in an articulated condition. Again, the drawing of FIG. 2 shows the plane 11 which extends through the joint center 12 even when the joint is articulated, with the centers of curvature 13, relative to the joint axis of rotation 15 of the respective joint member 1 and 5, forming an angle $\omega$ which is smaller than or equal to 85°.

Figure 3:
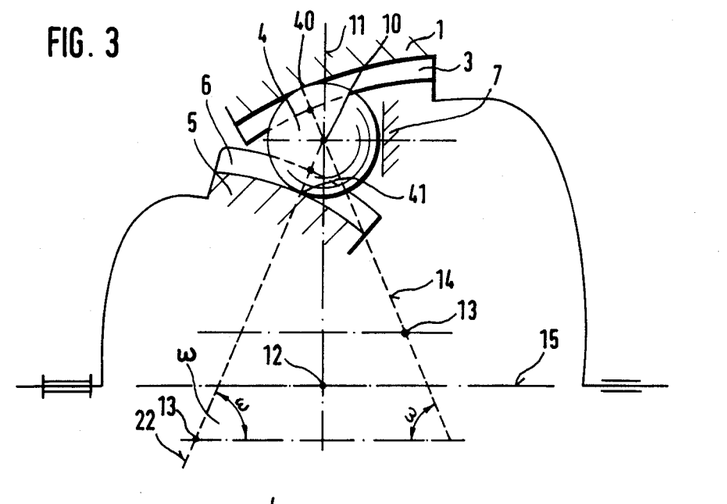
FIG. 3 is a schematic diagram depicting theoretical parameters of the inner and outer joint members.

FIG. 3 illustrates the theoretical considerations related to the embodiment of the invention wherein the outer joint member 1 and the corresponding inner joint member 5 having the grooves 3 and 6 accommodate the torque-transmitting balls 4. The supporting element 7 is indicated schematically and the grooves 6 and 3 of the inner joint member 5 and the outer joint member 1 extend in such a manner that the center 13 of the radius of curvature is positioned on a line 22 or 14, respectively, which forms an angle $\omega$ with the axis of rotation 15 of the joint. The angle $\omega$ should always be smaller than 85°. Furthermore, FIG. 3 shows that under these conditions it is irrelevant whether the center 13 of the radius of curvature is arranged on the side of the joint center 12 facing or away from the grooves 3, 6.

Figures 4, 5:
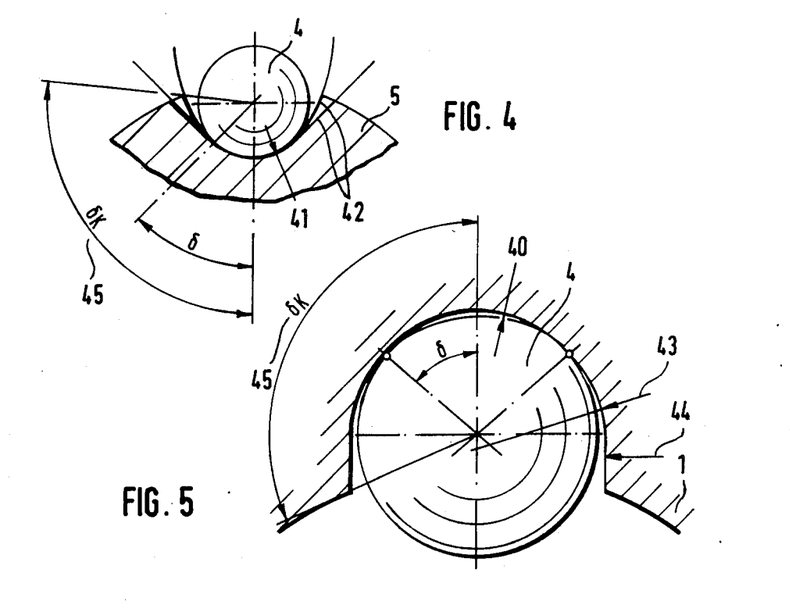
FIG. 4 is a partial sectional view showing a part of the inner joint member.
FIGS. 5 and 6 are partial sectional schematic views showing different designs of the grooves of the outer joint member.

FIG. 4 shows a more detailed cross-sectional view of the grooves 6 of the inner joint member 5 on an enlarged scale. As indicated in FIG. 4, the ball 4 is supported in a track base 41 and the contact angle between the track base 41 and the ball 4 is indicated by the angle $\delta$. In accordance with the invention, the angle $\delta$ is smaller than 50°. A track flank 42 is shown which may extend tangentially or along a radius which is greater than the track base 41.

Figure 6:
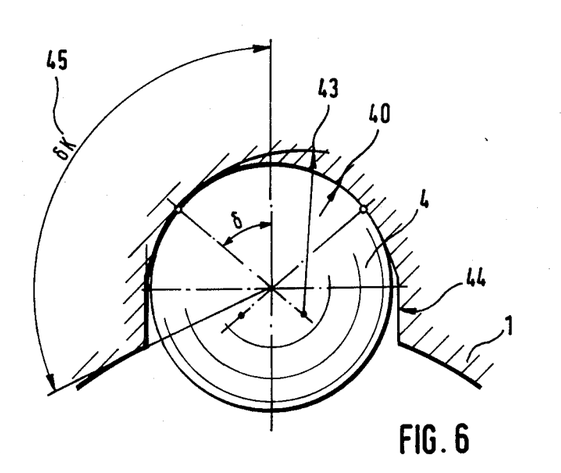

FIGS. 5 and 6 depict in greater detail the grooves 3 of the outer joint member 1 wherein the ball 4 is illustrated. The grooves 3 are designed in such a manner that, as viewed in cross-section, they are undercut-free so that non-chip producing production techniques or formation processes may be applied without difficulty. Run-outs 44 of the track edge are shown which extend parallel and which open with an increasing distance from the groove base 40 even when the track edge angle exceeds 90°. Freedom from undercuts is ensured in order to permit corresponding production processes for manufacturing of the outer joint member 1.

Figure 7:
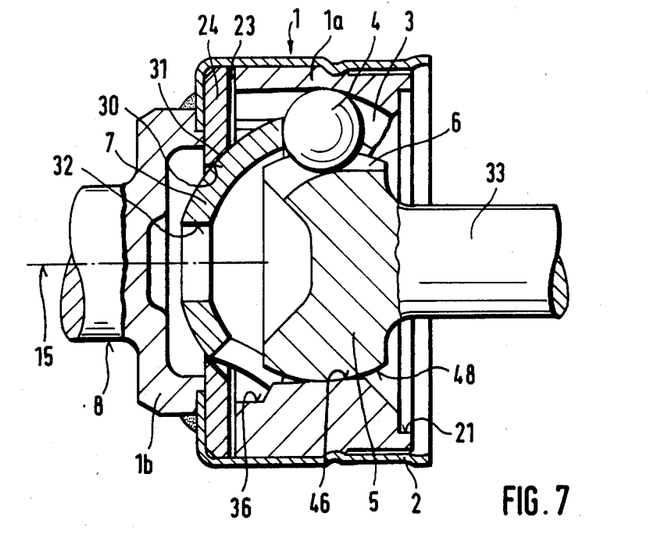
FIG. 7 is a sectional view showing a further embodiment of the invention wherein a supporting disc is utilized.

FIG. 7 depicts a further embodiment of a joint in accordance with the invention wherein the supporting element 7 supports itself toward the joint interior on a supporting disc 24. A guiding face 30 which cooperates with a counter face of the supporting element 7 extends along the same radius as that of the supporting element 7 or it may have a line contact 31. During assembly, a cylindrical hollow space 23 is used to fit the joint with a corresponding clearance or even so as to be clearance-free. A bore 32 is used during production for technical reasons so that external machining of the support element 7 is not necessary beyond the dead center. In addition, the bore 32 is provided to operate as a lubricant channel. A turned-out section or stepped configuration 36 permits freewheeling of the support element 7, with the diameter of the turned-out section 36 being smaller than the outer diameter of the supporting elements because the intermediate elements designed as fingers engage into the grooves 3 of the outer joint member 1.

Figure 8:
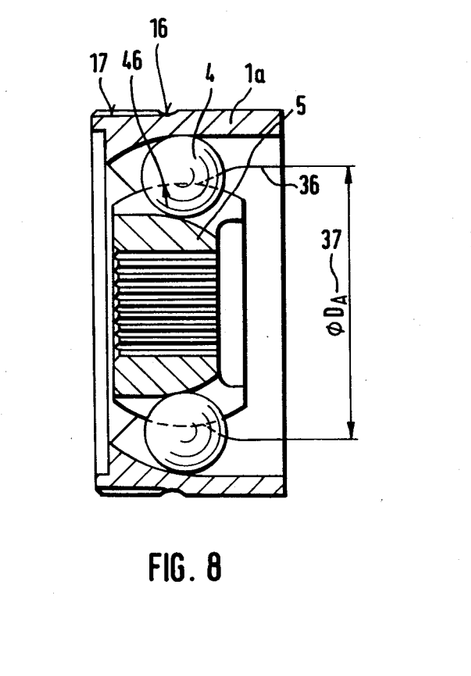
FIG. 8 is a sectional view showing the inner parts of the joint including the inner and outer joint members together with the balls.
Figure 9:
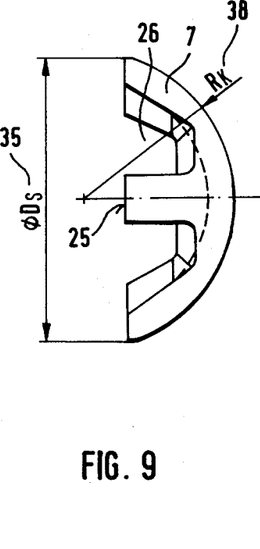
FIG. 9 is a side view showing the supporting element of the joint as an individual component.
Figure 10:
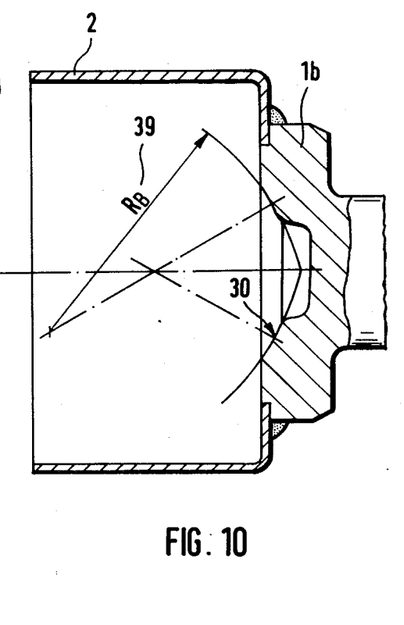
FIG. 10 is a partial sectional view of the outer joint member.

Referring now to FIGS. 8, 9, and 10, there is shown the various parts of a joint assembly with FIG. 10 illustrating the outer joint member 1b, FIG. 9 showing the supporting element 7, and FIG. 8 showing the part 1a of the outer joint member.

The outer joint member part 1b illustrated in FIG. 10 is formed together with the sleeve 2 in an arrangement adapted to be connected with the part 1a of the outer joint member shown in FIG. 8. The joinder may be formed with a form-fitting engagement by means of a recess 16 and with longitudinal grooves 17. As shown in FIG. 8, first the inner joint member 5 and the balls 4 are fitted into the outer joint member part 1a. Subsequently, the supporting element 7 depicted in FIG. 9 is introduced and thereafter the sleeve 2 together with the part 1b of the outer joint member 1 is pushed over the part 1a and the assembly is joined in a form-fitting manner with the recesses 16 and the grooves 17.

Figure 11:
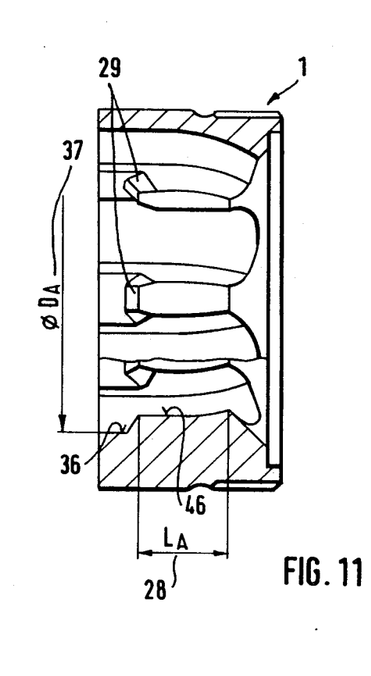
FIG. 11 is a sectional view of an outer joint member having a special type of stays.
Figure 12:
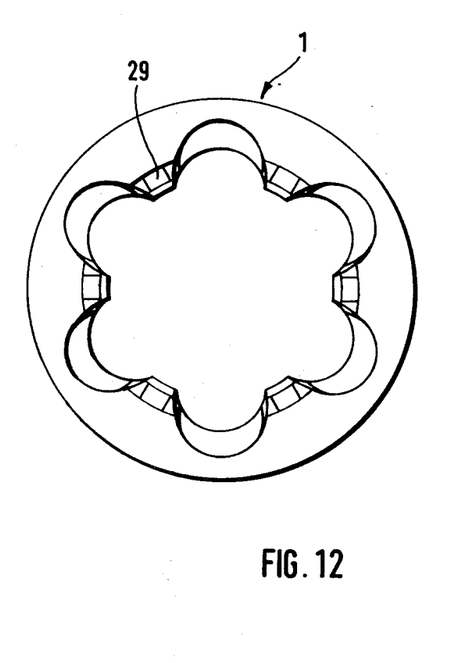
FIG. 12 is a plan view of the outer joint member of FIG. 11.
Figure 13:
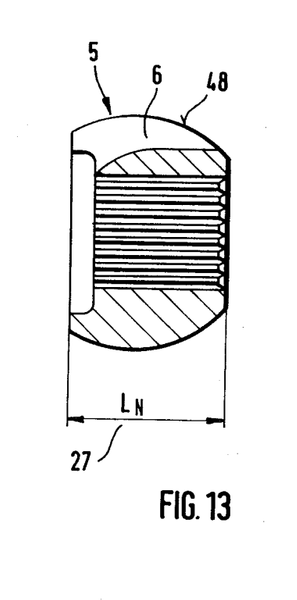
FIG. 13 is a sectional view of an inner joint member adapted for cooperation with the outer joint member shown in FIGS. 11 and 12.

FIGS. 11, 12, and 13 show an outer joint member and an inner joint member with the inner joint member being shown in FIG. 13 which is designed in such a manner that an increase in the angle of articulation can be achieved. The components are dimensioned such that the entire width 27 of the inner joint member 5 is wider than the length 28 of the outer joint member 1. However, it must be ensured that even under conditions of articulation the joint members 1 and 5 are permanently engaged. In order to permit a further increase in the angle of articulation, it is necessary for stays 29 remaining between the grooves 3 to be tapered toward the end facing the supporting element 7. In this manner, space is produced which is required for articulation of the inner joint member.

Figure 14:
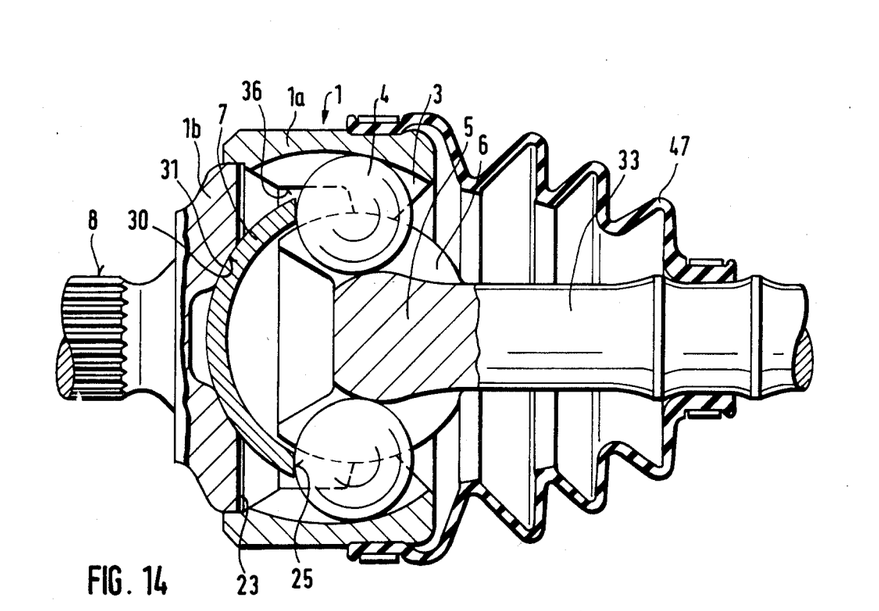
FIG. 14 is a sectional view of a universal joint assembly of an embodiment of the invention wherein the supporting element is designed as a ball socket section.

FIG. 14 shows an embodiment of a rotary constant velocity joint which, in principle, corresponds to the joint illustrated in FIG. 1, the difference being that the supporting element 7 is designed as a ball socket section with a supporting end 25 extending over the entire circumference. In this embodiment, provision is also made for a cylindrical hollow space 23 which permits clearance-free assembly.

Figure 15:
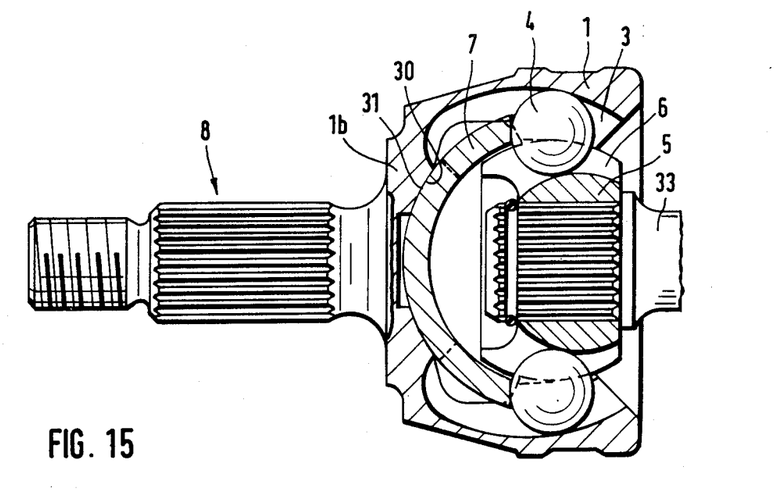
FIG. 15 is a sectional view illustrating an embodiment of the invention wherein a line contact exists between the supporting element and the outer joint member.

FIG. 15 illustrates a further embodiment which, in principle, corresponds to the embodiment shown in FIG. 14, the difference being that the outer joint member 1 is formed as a unitary part. With such an embodiment, it is necessary for a shaft 33 and the inner joint member 5 to be formed as two individual components so that assembly of the joint may be achieved.

Figures 16, 17:
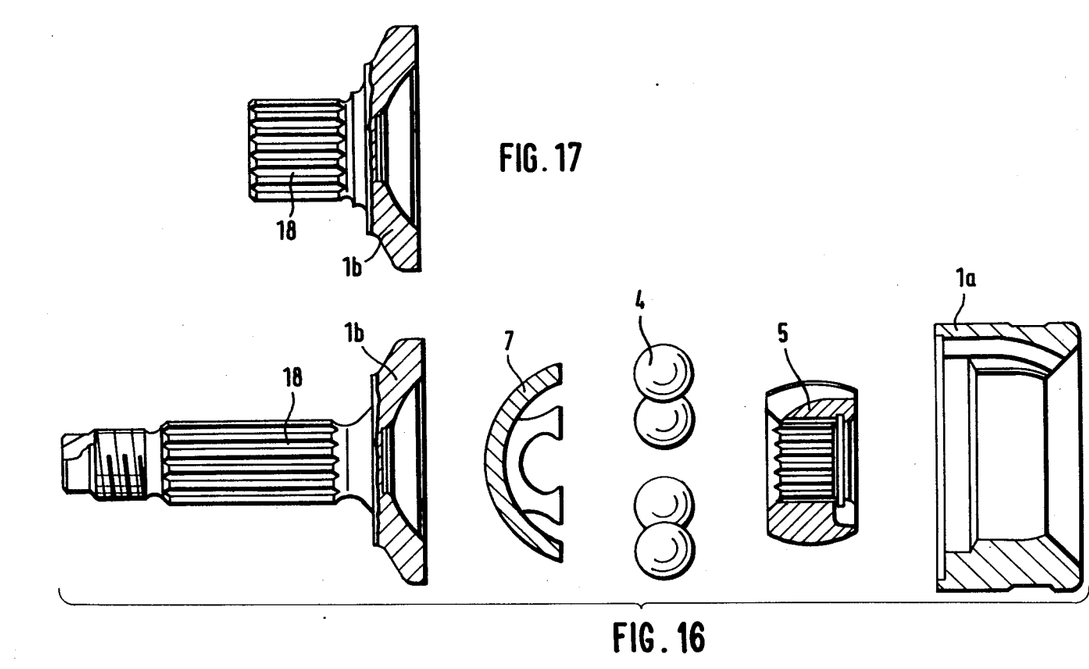
FIG. 16 is an exploded view showing individual components of the joint of FIG. 1 in order to facilitate explanation of the order of assembly of the parts thereof.
FIG. 17 is a sectional view of a further connecting part of a joint in accordance with the invention.

FIG. 16 shows the individual components of the joint separately but arranged in the direction of assembly thereof and it will be seen that the joint components again comprise a part 1a of the outer joint member, the inner joint member 5, the torque-transmitting balls 4, and the supporting element 7. The part 1b of the outer joint member 1 is provided with a pin 18, this pin being adaptable for connection with a device such as a motor vehicle.

FIG. 17 shows a part 1b which incorporates a differently designed pin 18.

Figure 18:
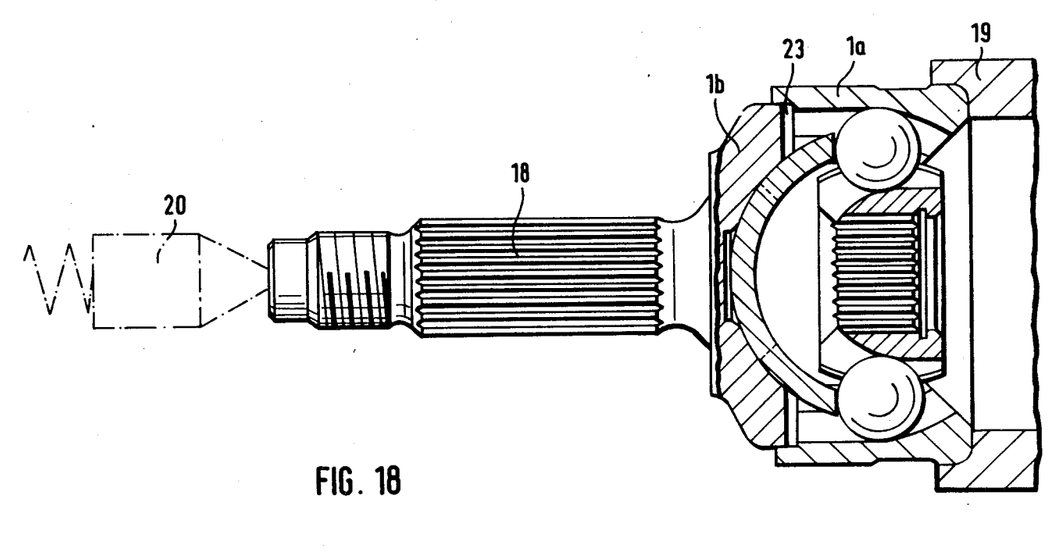
FIG. 18 is a sectional view illustrating a joint in its final assembled condition in a tool holder.

In FIG. 18 there is illustrated a joint in accordance with the present invention shown in the assembled condition with the outer joint member 1 accommodated in a holding device 19 and with the pin 18 and therefore the second part 1b of the outer joint member being held under a pretension by a further tool 20 which operates to permit the parts 1a and 1b to be welded together.

Thus, it will be seen that in accordance with the present invention there is provided a structure which will enable simplification of a universal joint while maintaining favorable production conditions wherein apart from simplification of the ball guidance system and the support elements there occurs an increase in the angle of articulation. Additionally, the invention is directed toward achievement of easy axial assembly of the joint without axial clearance, with a type of assembly which permits the components to be secured to each other after assembly in such a manner that they cannot be unfastened.

The objective of the invention is generally achieved in that the balls 4 in the joint interior, at one end, are supported by a supporting element 7 arranged in a jaw-like opening and that the curved grooves of the inner joint member 5 and the grooves of the outer joint member 1 are arranged in such a way that a connecting line 22 which extends between the center 13 of the radius of curvature and the ball center 10 forms, relative to the axis of rotation 15 of the joint, an angle $\omega$ which is smaller than or equal to 85°.

Various embodiments of the invention are shown and specific details of the structure of the grooves in the joint members are provided. For example, it will be seen that in accordance with an embodiment of the invention, the balls 4 may support themselves in the track base area 40, 41 of the grooves 3, 6 even during the torque-transmitting process.

Furthermore, in accordance with an additional essential feature of the invention, the angle $\omega$ may have a value which is smaller than or equal to 80° if the contact angle $\delta$ between the groove and the ball, measured from the groove base, is smaller than or equal to 50°, the advantage of this embodiment being that the cost-effective production can be achieved by increasing tolerances and that joint angles of more than 45° can be obtained without difficulty.

Furthermore, it is possible for the center lines of the grooves of the outer joint member to consist of groove parts having different curvatures, with the groove parts having the more pronounced curvature being arranged at the end of the outer part away from the supporting element.

Additionally, provision is made for the track flanks in the cross-section of the grooves, starting from the contact line or from the contact point between the groove and the ball, to extend tangentially or in a radius which is greater relative to the groove base.

The modification of the contact point, when introducing the torque for a track flank with the tangent being 0 and for a radius greater than the groove base depending on the size of the radius as compared to other known groove designs becomes very restrictive.

According to a further embodiment of the invention, when a track edge angle $\delta_K$ of the grooves is greater than 90°, the track flank run-out is undercut-free with the track flank run-outs of a groove extending parallel relative to each other or opening with an increasing distance from the groove base.

Provision has further been made for the center of the radius of curvature to be arranged on the line in the region between the joint center and the ball center or in the area starting from the ball center and extending beyond the joint center.

Provision has further been made for the groove to be undercut-free, the advantage being that even with an undercut-free groove design, the groove shape may be adapted to the respective production process, e.g., cold extruding, apart from the optimizing possibilities for the joint itself.

According to a further feature of the invention, the outer joint member has been designed to form two parts and to comprise a groove-containing part and a connecting part, with a supporting disc being arranged between the parts, the advantage being that a connection cannot be provided until after assembly of the joint.

The advantage of this embodiment is that by using standard parts the amount of material required as well as storage and production costs may be reduced for example, by larger batch sizes or larger numbers of parts. A further advantage consists in the economic production of the disc-shaped part of the outer joint member and of the inner joint member where the grooves for containing the balls extend in an undercut-free way and may be produced by cold or hot extrusion, precision forging and/or subsequent calibration.

In accordance with a further feature of the invention, the connecting part and the outer joint member are connected to each other by welding or in a form-fitted manner by means of a sleeve surrounding the two parts.

If the supporting disc is used, the connecting part does not need to be hardened.

Between the connecting part and the sleeve or the supporting disc and the end face of the outer part facing the joint interior, provision has been made for a hollow space or at least a gap into which the connecting part may be pushed when the joint is assembled, thereby permitting compensation of axial play of the joint.

Provision may also be made for the outer joint member to have a cylindrical hollow space or gap between the part or supporting disc respectively and the part as a free space for the compensation of the axial play of the joint.

It is also advantageous that the inner diameter of the outer joint member, which serves as a guiding face for the inner joint member, is undercut-free.

In order to achieve accurate assembly, without causing any distortion or deformation of the ball grooves, a further essential feature provides for the outer joint member to have a turned-out section for receiving an assembly tool.

In order to ensure that grinding of the supporting element does not have to take place beyond the dead center, provision is made for the supporting element, in the area of the axis of symmetry, to have a bore whose diameter is greater than 0 but smaller than the outer diameter of the shaft. This bore also improves the supply of lubricant to the cooperating guiding faces.

Furthermore, the end of the supporting element facing the balls has been designed across the entire circumference so as to be annular and as not having any recesses.

A further important feature provides for the diameter of the supporting element to be greater than the turned-out section in the outer joint member.

In order to achieve a large angle of articulation, the joint members must be permanently engaged. In order to ensure this, provision has been made for the entire width of the guiding face of the groove-containing inner joint member cooperating with the outer joint member to be at least 20% wider than the width of the guiding face of the outer joint member taking over the guidance of the inner joint member.

A further way of increasing the angle of articulation is for the stays remaining between two adjoining grooves of the outer joint member to be tapered toward the end facing the supporting element.

In accordance with a further essential feature, the connecting part for the supporting disc comprises a guiding face which cooperates with the supporting element, and there is a circumferentially extending line contact, with a radius $R_B$ being greater than a radius $R_K$ (see FIGS. 9 and 10). The radius $R_B$ may also be infinitely great, as a result of which a cone-shaped guiding face is produced.

In addition, provision has been made for the guiding face to be formed by a supporting disc.

The process for assembling a rotary constant velocity joint in accordance with the invention is characterized in that initially, in an initial direction, the connecting part, the supporting element, the balls, the inner joint member, and the groove-containing part of the outer joint member, one after the other, are joined upon impact and that subsequently, the connecting part and the outer joint member are connected in such a manner that they cannot be unfastened, or that initially the outer joint member and finally the connecting part are joined.

The advantage of this design is that the assembly to the outer part can take place in the axial direction so that the parts are introduced into the outer joint member and that as a final step the pin of the outer joint member is pushed in and the play is offset by corresponding pressure in the joint. After introduction of the pin, a form-fitting connection of the two parts or welding may take place thereby giving the joint its final shape.

Thus, it will be seen from the foregoing that the invention is particularly characterized in that the balls 4 in the joint interior, at one end, are supported by a supporting element 7 arranged at the jaw-like opening and that the curved grooves 6 of the inner joint member 5 and the grooves 3 of the outer joint member 1 are arranged in such a way that the connecting line 22 extends between the center 13 of the radius of curvature and the ball center 10 and forms an angle $\omega$ relative to the axis of rotation 15 of the respective joint member 1, 5, with the angle $\omega$ being smaller than or equal to 85°.

With the joint in accordance with the present invention, even during the torque-transmitting process, the ball 4 supports itself in the track base area 40, 41 of the groove 3, 6. The angle $\omega$ will have a value smaller than or equal to 80° if the contact angle $\delta$ between the groove 3, 6 and the ball 4 measured from the groove base is smaller than or equal to 50°.

The center lines of the grooves 3 of the outer joint member 1 consist of groove parts with different curvatures, with the groove parts having the most pronounced curvature being arranged at the end of the outer part away from the supporting element 7. The track flanks 42, 43 in the cross-section of the grooves 3, 6 starting from the contact line or from a contact point between groove 3, 6 and the ball 4, extend tangentially or in a radius which is greater relative to the groove base.

As shown in the drawings, with a track edge angle $\delta_K$ (45) of the grooves 3, 6 greater than 90°, the track flank run-out 44 is undercut-free, and the track flank run-outs 44 of a groove 3, 6 extend parallel relative to each other or open with an increasing distance from the groove base 40, 41.

The center 13 of the radius of curvature has been arranged on the line 22 in the region between the joint center 12 and the ball center 10 or in the area starting from the ball center 10 and extending beyond the joint center 12.

Furthermore, it will be seen that the inner diameter of the outer joint member 1, which serves as a guiding face 46 for the inner joint member 5, is undercut-free. The outer joint member 1 has a turned-out section 21 for receiving an assembly tool and in the area of the axis of symmetry the supporting element 7 has a bore 32 whose diameter is greater than 0 but smaller than the outer diameter of the shaft 33.

The end 25 of the supporting element 7 facing the balls 4 has been designed across the entire circumference so as to be annular and without any recesses such as the recesses 26.

The diameter 35 of the supporting element 7 is greater than the turned-out section 36 in the outer joint member and the entire width 27 of the guiding face 47 of the groove 6 containing the inner joint member 5 cooperating with the outer joint member is at least 20% wider than the width 28 of the guiding face 46 of the outer joint member 1 taking over the guidance of the inner joint member 5.

The stays 29 remaining between the two adjoining grooves 3 of the outer joint member 1 are tapered toward the end facing the supporting element 7 and the connecting part 1b or the supporting disc 24 comprises a guiding face 30 which cooperates with the supporting element 7 and there is a circumferentially extending line contact 31, with the radius $R_B$ (39) being greater than the radius $R_K$ (38) as shown in FIGS. 9 and 10.

Thus, it will be seen from the foregoing that the invention provides a joint assembly having a simpler structure than the prior art while maintaining favorable production characteristics wherein apart from the simplification of the ball guidance and the support there also is produced an increase in the angle of articulation. Additionally, the invention seeks to achieve easy axial assembly of the joint without axial clearance and a type of assembly which permits the components to be secured to each other after assembly in such a manner that they cannot be unfastened.

While specific embodiments of the invention have been shown and described in detail to illustate the application of the inventive principles, it will be understood that the invention may be embodied otherwise without departing from such principles.

What is claimed is:

1. A rotary constant velocity universal joint, comprising:

an outer hollow joint member having an inner wall with curved grooves formed therein and a first shaft member connected thereto;

an inner joint member arranged in said outer joint member having an outer wall provided with a number of curved grooves corresponding to the number of said curved grooves in said outer joint member and a second shaft member connected thereto;

a plurality of torque-transmitting balls received in said grooves in torque-transmitting engagement between said inner and outer joint member, each of said grooves comprising a groove base and a track base area along which said balls are supported, said balls being in contact with said track base area across an angle $\delta$ extending angularly equidistantly from both sides of said groove base;

said grooves in said inner and in said outer joint members having a curved configuration such that each pair of said grooves consisting of one groove of each of said outer and inner joint member is arranged to form a jaw-like opening through which said balls may pass in one direction axially of said joint, said jaw-like opening facing toward the direction of said first shaft member;

a supporting element engaging said balls from only the side thereof facing toward said first shaft member to prevent said balls from passing through said jaw-like opening to hold said balls in torque-transmitting engagement within said curved grooves of said inner and outer joint members;

said supporting element being held within said joint so as to be movable relative to both said inner and outer joint members whereby it may be angled freely relative thereto in all directions of articulation of said joint;

said curvature of said grooves in both said inner and outer joint members being formed such that a connecting line extending between the center of the radius of curvature of each of said grooves and the center of said torque-transmitting balls forms an angle $\omega$ relative to the axis of rotation of said respective joint member, said angle $\omega$ being smaller than or equal to 80° and said angle $\delta$ being smaller than or equal to 50°.

2. A universal joint according to claim 1, wherein each groove comprises track flanks extending outwardly from said groove base beginning from a point of contact between said groove and said torque-transmitting balls and extending tangentially relative to said groove base with a radius of curvature greater than the radius of curvature of said groove base and wherein said grooves in said outer joint member comprise a track edge angle $\delta_K$ which is greater than 90°, track flank run-outs which are undercut-free, said track flank run-outs of each groove extending at least equidistantly to each other with an increasing distance from the groove base.

3. A universal joint according to claim 1 wherein said outer joint member is designed in two parts comprising a first part and a connecting part with a supporting disc being arranged between said first and said connecting part.

4. A universal joint according to claim 3 wherein said first part and said connecting part are connected by a sleeve surrounding said two parts.

5. A universal joint according to claim 1 wherein said outer joint member is formed with an inner diameter which is undercut-free and which serves as a guiding face for said inner joint member.

6. A universal joint according to claim 1 wherein said supporting element has an end facing said torque-transmitting balls which is configured across the entire circumference of said supporting element so as to be annular and devoid of recesses.

7. A universal joint according to claim 1 wherein said outer joint member is formed with a stepped configuration and wherein the diameter of said supporting element is smaller than the diameter of said stepped configuration in said outer joint member.

8. A universal joint according to claim 1 wherein said inner joint member and said outer joint member each contain guiding faces, with the guiding face of said inner joint member being arranged in cooperative relationship with the guiding face of said outer joint member to guide the relative movement therebetween, with said guiding face of said inner joint member having a width which is at least 20% wider than the width of said guiding face of said outer joint member.

9. A universal joint according to claim 1 wherein adjoining grooves of said outer joint member are formed to comprise stays which are tapered toward the end of said groove facing said supporting element.

10. A universal joint according to claim 1 wherein said outer joint member and said supporting element are each formed with guiding faces which cooperate with each other, with the guiding face formed in said outer joint member having a curvature with a radius $R_B$ and with the guiding face formed in said supporting element having a curvature with a radius $R_K$, the radius $R_B$ being greater than the radius $R_K$.

11. A universal joint according to claim 1, wherein said curved grooves of said outer joint member have a radius of curvature which increases in a direction taken axially toward said supporting element.

* * * * *